(12) United States Patent
Consiglio et al.

(10) Patent No.: US 6,462,651 B1
(45) Date of Patent: Oct. 8, 2002

(54) GEAR INDICATOR

(75) Inventors: Anthony John Consiglio, Lady Lake, FL (US); Robert L. Doss, Ringgold, GA (US); Michael Doss, Ooltewah, TN (US); John A. McGirr, Naples, FL (US)

(73) Assignee: Ooltewah Manufacturing, Inc., Ooltewah, TN (US)

( * ) Notice: Subject to any disclaimer, the term of this patent is extended or adjusted under 35 U.S.C. 154(b) by 0 days.

(21) Appl. No.: 09/829,807

(22) Filed: Apr. 10, 2001

(51) Int. Cl.[7] .................................. B60Q 1/00
(52) U.S. Cl. ...................... 340/456; 340/439; 340/459; 340/465; 340/510; 340/525; 74/473.21; 74/473.1
(58) Field of Search ............................. 340/438, 456, 340/439, 459, 463, 464, 465, 468, 510, 525, 563; 74/473.21, 473.1, DIG. 7; 116/28.1, DIG. 20

(56) References Cited

U.S. PATENT DOCUMENTS 4,157,044 A * 6/1979 Peltz ............................ 74/356
5,178,033 A * 1/1993 Kund ..................... 74/501.5 R
5,420,565 A * 5/1995 Holbrook ..................... 340/456
5,816,100 A * 10/1998 Fowler et al. ................. 74/335
6,112,841 A * 9/2000 Iwai et al. ..................... 180/19
6,151,977 A * 11/2000 Menig et al. .............. 74/336 R

FOREIGN PATENT DOCUMENTS

JP              60-8545       *  6/1983   ............. 74/DIG. 7

* cited by examiner

Primary Examiner—Jeffery Hofsass
Assistant Examiner—Daniel Previl
(74) Attorney, Agent, or Firm—Alan Ruderman; Stephen J. Stark; Miller & Martin

(57) ABSTRACT

A gear indicator provides a display to a motorcycle driver of which gear the motorcycle is currently operating in. The gear indicator is used with a gear position switch providing ground signal indication to a motorcycle CPU at a connection with a plurality of leads which reflect the gear a motorcycle is operating in, no indication indicating that the motorcycle is in first gear. The gear indicator bridges the gear position switch to the motorcycle CPU receiving this ground information through a bridge and a similar number of leads communicate with the gear indicator processor from this bridge. The processor of the gear indicator processes the information received to drive a display to reflect the gear to the operator.

16 Claims, 2 Drawing Sheets

GEAR INDICATOR

BACKGROUND OF THE INVENTION

Over 100,000 motorcycles sold under the brand name GOLD WING® have been manufactured since 1988 by Honda, Inc., with the transmission having a gear position switch for sensing the gear in which the transmission is operating. The gear position switch has an output in electrical communication with a central processing unit ("CPU") of the motorcycle. The motorcycle is equipped to sense the output of the gear position switch to determine if the motorcycle is in neutral to allow the starting system to start the motorcycle. There is no gear indication displayed to the motorcycle driver as to the particular gear in which the transmission is currently operating except an "N" appears on a display when the transmission is in neutral and an "OD" when the transmission is in 5th gear or overdrive. The gear position switch connects via a five lead connector at a connection with a receiving five lead connection to the motorcycle CPU at an accessible and detachable connection in the wiring harness of this motorcycle.

One safety feature which may be provided to the driver of a motorcycle is a visual gear indicator. Motorcycle transmissions may be shifted between a number of gears. The driver should know the particular gear in which the motorcycle is operating in certain circumstances. For instance, when a motorcycle driver needs to rapidly accelerate, the driver will often downshift in order to increase torque to accelerate. The driver may inadvertently downshift more than one gear. Failure to realize this event may create a safety hazard since the operator may over-rev the engine without achieving the desired acceleration. Furthermore, the driver may think a downshift has occurred when the transmission has not downshifted. Accordingly, the current gear may lack the necessary torque to accelerate a desired amount. By having a gear indicator on the motorcycle displaying the gear that the motorcycle is in, the operator would have the capability of quickly reading the gear in which the motorcycle is currently operating. The motorcycle driver no longer need to remember, or otherwise guess, the gear the transmission is operating.

At least one other major motorcycle manufacturer, Kawasaki, Inc., has developed a mechanical gear indicator wherein the transmission is mechanically coupled to a gear indicator which indicates the gear to a driver. It is believed that it would be relatively expensive and difficult to partially disassemble a transmission to install a similar mechanical linkage means which would cooperate with a mechanical gear indicator for the above mentioned Honda motorcycle. Accordingly a need exists for a gear indicator which would indicate the current gear of the motorcycle to a rider which can interpret the electrical signal provided from the gear position switch to the motorcycle CPU.

The only two current known uses by the motorcycle CPU of the gear position switch connector are (1) to process whether or not the motorcycle is in neutral to determine if it is in a proper condition to start the motorcycle, and (2) display an "N" when in neutral on a display and (3) display an "OD" for overdrive. Accordingly since one of the five leads provides a predetermined signal when the switch senses neutral, the motorcycle CPU interprets this data to provide the appropriate setting to allow an operator to start the motorcycle. Nevertheless, no indication is provided to the operator as to the current forward moving gear in which the motorcycle is operating other than the top gear of "OD" for this motorcycle.

SUMMARY OF THE INVENTION

The present invention provides for a gear indicator which displays the current gear in which the motorcycle is operating to a driver of a motorcycle equipped with a gear position switch. The gear indicator has a connection which receives the five leads from the gear position switch of the motorcycle and bridges that signal on to the five position connector to the motorcycle CPU. While bridging the gear indicator to the CPU, the signals are also sent via a five lead harness to a gear indicator processor. The processor interprets which, if any, of the five leads are showing a signal. If none of the five leads indicate a signal, then the gear indicator assigns a first gear indication. If any one of the five leads reports a signal, then that respective signal is processed by the processor to provide a gear indication signal at a display. The preferred embodiment also includes a voltage meter since the gear indicator meter is preferably driven by the motorcycle's battery, and the voltage is accessible for measurement by this device.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
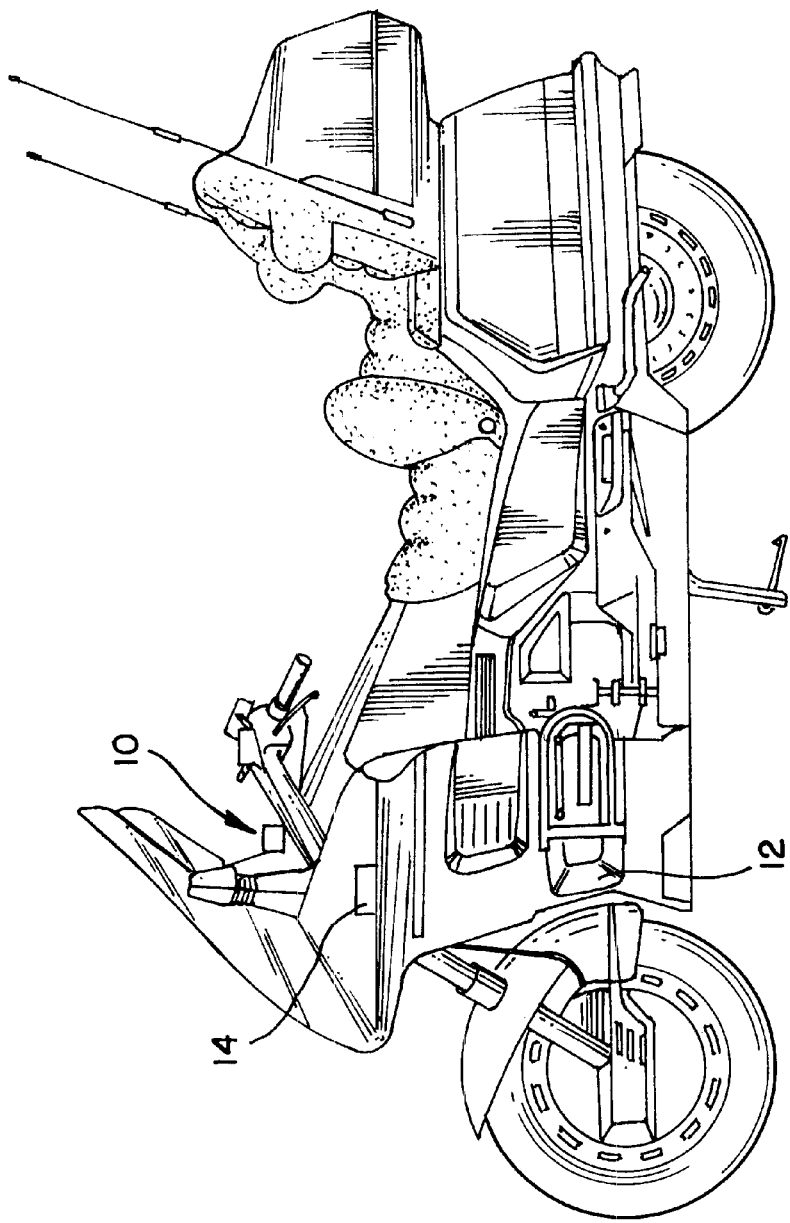
FIG. 1 is a perspective view of a motorcycle incorporating the gear indicator of the preferred embodiment of the present invention.

A motorcycle 100 incorporating a gear indicator 10 of the preferred embodiment is illustrated in FIG. 1. As illustrated there is a gear position switch 12 which is located in the front of the motorcycle and a motorcycle central processing unit (CPU) 14.

Figure 2:
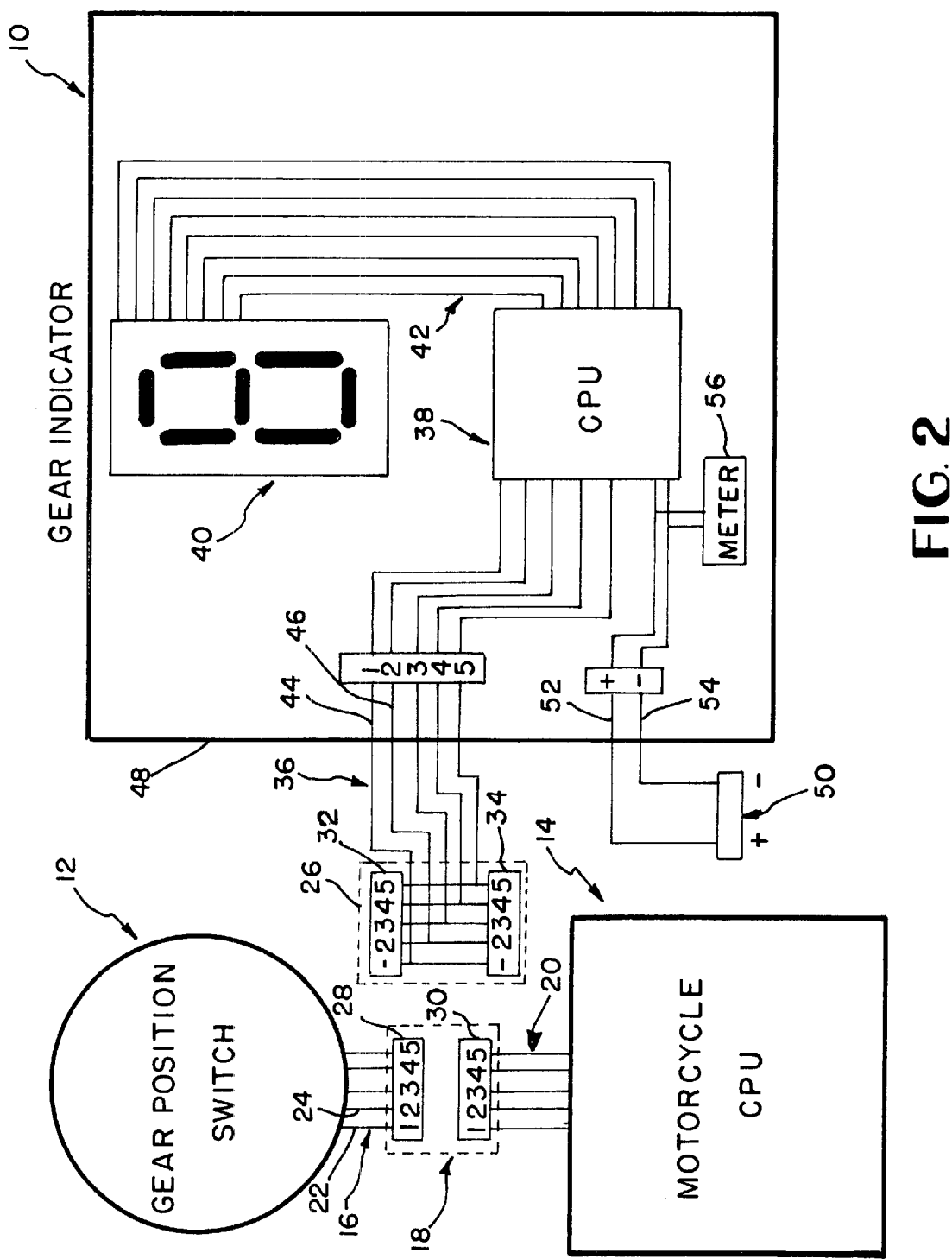
FIG. 2 is a schematic drawing of the gear indicator of the preferred embodiment.

The gear indicator 10 of the preferred embodiment, illustrated schematically in FIG. 2, is designed specifically to work with the GOLD WING® motorcycles manufactured by Honda Motor Co. between 1990 and 2000. The 1990 to 2000 models from the factory do not provide visual gear indication to the driver of this motorcycle except for a neutral and overdrive indication. Accordingly, the preferred embodiment is an accessory, or add-on, for use with these particular motorcycles. Of course, if other motorcycles employ gear position switches 12 and motorcycle CPU's 14 which operate similarly to this particular model, then similar gear indicators 10 according to the present invention may be added as an accessory to those motorcycles, as well.

Specifically, before installing the gear indicator 10, the gear position switch 12 provides ground signals through a five lead conduit to a connection 18. The connection 18 accepts the five leads 16 from the gear position switch and communicates signals from these five leads 16 to five leads 20 which are directed to the motorcycle CPU 14.

The CPU 14 processes the information received from the gear position switch 12 to determine if the transmission is in neutral. If the transmission is in neutral, then the motorcycle CPU 14 will allow the motorcycle to be started. Otherwise, the starting capability is disabled by signals provided to the starting system from the CPU 14.

The CPU 14 determines if the transmission is in neutral by processing the information from the switch 12. If the transmission is in neutral, then the first lead 22 sends a first predetermined signal, such as the presence of light, to the CPU 14. If the transmission is in any other gear, then this predetermined signal is not sent to the CPU 14. Similarly, if the transmission is in second gear, the second lead 24 sends a second predetermined signal to the CPU. If the transmission is in any other gear, then the second predetermined signal is not sent via the second lead to the CPU. The other three leads operate in a similar fashion for third, fourth and fifth gears. If none of the five leads are providing any of the predetermined signals, then the transmission is in first gear. The CPU 14 only utilizes the data from the first lead to allow the starting system to start the motorcycle.

The gear indicator 10 includes a signal coupler or bridge 26 in the form of a connector which is designed to cooperate with the output connector 28 of the switch 12 and the input connector 30 of the CPU which come from the factory joined at connection 18 in the wiring harness. The output connector 28 and the input connector 30 are separated to disengage the connection 18. The switch output 28 is then connected to bridge input 32 and the CPU input 30 is connected to bridge output 34 which allows the switch 12 to continue to communicate signals to the CPU 14.

With the bridge 26 installed, there are now five leads 36 transmitting data to the gear indicator processor 38. The processor 38 analyzes the data to provide the appropriate signal to display 40 through the leads 42. The leads 42 provide the appropriate instruction to the display 40 from the processor 38 to indicate the gear the transmission is presently operating.

The processor 38 preferably receives the five leads 36 and analyzes them to determine which if any of the leads 36 are transmitting the appropriate predetermined signal corresponding to a particular gear position. If any of the five leads 36, such as neutral gear lead 44 or second gear lead 46, have the appropriate predetermined signal, then the processor 38 provides a lower case "-" signal or a "2" signal to the display 40 through the leads 42. This analysis is performed for all five leads 36 providing data input into the processor 38. If none of the five leads 36 have an appropriate predetermined signal, then a NOR-type logic function provides a signal to the display 40 to indicate the first gear, i.e., "1".

A housing 48 may contain the display 40 and processor 38 therein. The bridge 26 is configured to be located on the wiring harness between the switch output 28 and CPU input 30. The five leads 36 are preferably contained within a conduit leading to the housing 48 of the gear indicator 10.

The gear indicator is powered from the motorcycle battery 50. The positive and negative terminals 52, 54 provide the power necessary to operate the display 40 and the processor 38 in the preferred embodiment. Specifically, there are seven segments in the display 40. Seven leads connect to each of the seven segments, while the eighth lead connects with one of the battery terminals 52, 54 (of course, the voltage may be stepped up or down as necessary to provide a desired voltage to the display 40). When the processor 38 provides signals to illuminate the display 40 with an indication, the appropriate leads 42 provide the signals driven at least partially from the battery 50 to illuminate the indication on the display 40. A voltage meter 56 may also be included in the housing 48 to provide battery voltage indication to the motorcycle driver as shown.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A gear indicator for use with an output from a gear position switch having a plurality of leads for transmitting data via at least one predetermined signal through at least one of the plurality of leads when a transmission is in a particular gear, and a central processing unit which receives via an input through a similar number of plurality of leads the data from the gear position switch, said input of the central processing unit detachably connected to the output of the gear position switch, and said indicator comprising:

a bridge having a bridge input and a bridge output, said bridge input connectable to the output of the switch, and said bridge output connectable to the input of the central processing unit, wherein the bridge has an appropriate number of bridge leads to communicate data from the gear position switch to the central processing unit;

a display for reporting the gear of the gear position switch;

a plurality of bridge connections, said bridge connections communicating each of the leads from the gear position switch to a processor; and a processor interpreting the data received from the bridge connections and providing display signals to the display to reflect the gear indicated by the gear position switch.

2. The gear indicator of claim 1 wherein the transmission is a motorcycle transmission and the output of the switch conducts the data through five leads, said first lead providing a first predetermined signal when the motorcycle transmission is in a neutral gear.

3. The gear indicator of claim 2 wherein a second of the five leads provides a second predetermined signal when the motorcycle transmission is in a second forward moving gear.

4. The gear indicator of claim 1 wherein if none of the five leads are reporting an appropriate predetermined signal, the processor of the gear indicator provides a third signal to the display to indicate first gear.

5. The gear indicator of claim 1 wherein the processor is electrically driven by a motorcycle battery.

6. The gear indicator of claim 5 further comprising a voltage meter connected to the motorcycle battery.

7. The gear indicator of claim 6 further comprising a housing and the voltage meter and the display are supported by the housing and viewable by a motorcycle driver when installed.

8. The gear indicator of claim 1 further comprising a housing and the display is supported by the housing.

9. The gear indicator of claim 1 wherein the output of the gear indicator switch is transmitted via ground signals.

10. A combination of a gear indicator and a motorcycle equipped with a gear position switch monitoring a motorcycle transmission, said gear position switch having a plurality of leads transmitting data via at least one predetermined signal through the plurality of leads when the transmission is in a particular gear and a motorcycle central processing unit which receives the data via an input through a similar number of plurality of leads the data from the gear position switch, said input of the central processing unit communicating with the output of the gear position switch, and said indicator comprising:

a bridge having a bridge input and a bridge output, said bridge input connected to the output of the switch, and said bridge output connected to the input of the central processing unit, wherein the bridge has an appropriate number of bridge leads to communicate the data from the gear position switch to the central processing unit;

a display for reporting the gear of the gear position switch;

a plurality of bridge connections communicating each of the leads from the gear position switch to the processor; and a processor interpreting the data received from the bridge connections to drive the display to reflect the appropriate gear reported by the gear position switch.

11. The combination of claim 10 wherein the plurality of leads from the gear position switch comprises five leads and a first of the five leads communicates a first predetermined signal to the display when the gear position switch detects the motorcycle transmission is in neutral.

12. The combination of claim 11 wherein a second of the five leads communicates a second predetermined signal to the display when the gear position switch indicates the motorcycle transmission is in a second gear.

13. The combination of claim 12 wherein the processor of the gear indicator provides a third signal to the display to indicate a first gear when no predetermined signals are received from the five leads.

14. The combination of claim 10 wherein the motorcycle further comprises a motorcycle battery, said battery providing a voltage to the gear indicator.

15. The combination of claim 14 wherein the gear indicator further comprises a voltage meter for displaying voltage of the motorcycle battery.

16. The combination of claim 10 wherein the output of the gear position switch is transmitted in ground signals.

* * * * *